US008160017B2

(12) United States Patent
Ishii et al.

(10) Patent No.: US 8,160,017 B2
(45) Date of Patent: Apr. 17, 2012

(54) RADIO RESOURCE SELECTING METHOD, MOBILE STATION AND RADIO BASE STATION

(75) Inventors: Hiroyuki Ishii, Yokosuka (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/922,711

(22) PCT Filed: Mar. 27, 2009

(86) PCT No.: PCT/JP2009/056321
§ 371 (c)(1),
(2), (4) Date: Nov. 16, 2010

(87) PCT Pub. No.: WO2009/119818
PCT Pub. Date: Oct. 1, 2009

(65) Prior Publication Data
US 2011/0164579 A1 Jul. 7, 2011

(30) Foreign Application Priority Data

Mar. 28, 2008 (JP) .............................. P2008-088819
Mar. 24, 2009 (JP) .............................. P2009-072961

(51) Int. Cl.
*H04W 74/04* (2009.01)
(52) U.S. Cl. ..... 370/329; 370/341; 370/437; 455/452.1; 455/455; 455/517
(58) Field of Classification Search .......................... None
See application file for complete search history.

(56) References Cited

U.S. PATENT DOCUMENTS

| 6,021,123 | A | * | 2/2000 | Mimura | 370/331 |
|---|---|---|---|---|---|
| 7,920,516 | B2 | * | 4/2011 | Nishio et al. | 370/328 |
| 8,046,019 | B2 | * | 10/2011 | Hosein | 455/522 |
| 2007/0060146 | A1 | * | 3/2007 | Won et al. | 455/445 |
| 2007/0133458 | A1 | | 6/2007 | Chandra et al. | |
| 2008/0298488 | A1 | * | 12/2008 | Shen et al. | 375/260 |
| 2008/0311919 | A1 | * | 12/2008 | Whinnett et al. | 455/447 |
| 2009/0046645 | A1 | * | 2/2009 | Bertrand et al. | 370/329 |
| 2009/0075667 | A1 | * | 3/2009 | Bourlas | 455/452.1 |
| 2009/0245198 | A1 | * | 10/2009 | Tiirola et al. | 370/330 |
| 2009/0268693 | A1 | * | 10/2009 | Lindh et al. | 370/336 |
| 2009/0290538 | A1 | * | 11/2009 | Kim et al. | 370/328 |
| 2011/0149896 | A1 | * | 6/2011 | Ofuji et al. | 370/329 |

OTHER PUBLICATIONS

Supplementary European Search Report for application No. EP 09 72 6065, mailed on Mar. 9, 2011, 9 pages.

(Continued)

*Primary Examiner* — Hassan Phillips
*Assistant Examiner* — Duc Duong
(74) *Attorney, Agent, or Firm* — Osha Liang LLP

(57) ABSTRACT

A mobile communication method according to the present invention includes the steps of; (A) notifying, from a radio base station (eNB) to a mobile station (UE), a first cycle and information on the uplink radio resource; and (B) determining, at the mobile station (UE), a first allocation starting time, receiving a downlink data via a downlink radio resource and transmitting an acknowledgement information via an uplink radio resource at and after the first allocation starting time, when receiving a fixed allocation signal from the radio base station (UE). In the step (B), the uplink radio resource is adjusted by an adjustment signal included in the fixed allocation signal and the acknowledgement information is transmitted via the adjusted uplink radio resource.

21 Claims, 6 Drawing Sheets

OTHER PUBLICATIONS

Qualcomm Europe: "Allocation of semi-persistent resources," R2-081072, 3rd Generation Partnership Project (3GPP), Mobile Competence Centre; 650, Route Des Lucioles; F-06921 Sophia-Antipolis Cedex; France, vol. RAN WG2, no. Sorrento, Italy; 20080205, Feb. 15, 2008; 1 page.

NTT DoCoMo, Inc., "UL ACK/NACK resource allocation for DL semi-persistent scheduling," 3GPP TSG RAN WG2 #62, R2-082485, May 5-9, 2008, 4 pages.

LG Electronics, "UL ACK/NACK logical index mapping relation details," 3GPP TSG RAN WG1 #51bis, R1-080268, Jan. 14-18, 2008, 4 pages.

NEC Group, "PUCCH allocation for ACK/NACK transmission," 3GPP TSG RAN WG1 Meeting #50bis, R1-074169, Oct. 8-12, 2007, 5 pages.

3GPP TS 36.211 V8.1.0, "Evolved Universal Terrestrial Radio Access (E-UTRA); Physical Channels and Modulation," Nov. 2007, 54 pages.

3GPP TS 36.300 V8.3.0, "Evolved Universal Terrestrial Radio Access (E-UTRA) and Evolved Universal Terrestrial Radio Access Network (E-UTRAN)," Dec. 2007, 121 pages.

3GPP TS 36.213 V8.1.0, "Evolved Universal Terrestrial Radio Access (E-UTRA); Physical layer procedures," Nov. 2007, 17 pages.

Samsung, et al., "Joint proposal on uplink ACK/NACK channelization," 3GPP TSG RAN WG1 Meeting #51bis, R1-080035, Jan. 14-18, 2008, 6 pages.

International Search Report issued in PCT/JP2009/056321, mailed on May 26, 2009, with translation, 3 pages.

Written Opinion issued in PCT/JP2009/056321, mailed on May 26, 2009, 3 pages.

Japanese Office Action mailed Jun. 2, 2009; Reference No. 2008P00613; Japanese Patent Application No. 2009-072961 with English translation (4 pages).

Communication from the European Patent Office for Application No. 09726065.7 dated Sep. 9, 2011 (4 pages).

* cited by examiner

RADIO RESOURCE SELECTING METHOD, MOBILE STATION AND RADIO BASE STATION

TECHNICAL FIELD

The present invention relates to a radio resource selecting method in which a mobile station receives downlink data, transmitted from a radio base station, by using a downlink radio resource fixedly allocated in first cycles starting from a first allocation starting time, and transmits acknowledgement information for the downlink data by using a fixedly allocated uplink radio resource, and relates to the mobile station and the radio base station.

BACKGROUND ART

A communication method as a successor of the W-CDMA and the HSDPA, namely, the Long Term Evolution (LTE) has been considered by the W-CDMA standardization organization 3GPP, and the specification setting work is underway.

As a radio access method of the LTE, use of the OFDMA in the downlink and the SC-FDMA (Single-Carrier Frequency Division Multiple Access) in the uplink is under consideration.

The OFDMA is a method for dividing a frequency band into a plurality of narrow frequency bands (sub-carriers) and transmitting data loaded on the respective divided frequency bands. In this method, high-speed transmission can be achieved and frequency utilization efficiency can be improved by arranging sub-carriers densely on the frequency bands in such a manner that the sub-carriers partially overlap but do not interfere with each other.

The SC-FDMA is a transmission method which can reduce interference between terminals by dividing a frequency band and transmitting data by using frequency bands different among plural terminals. The SC-FDMA has a feature of less fluctuation in the transmission power, which can achieve low power consumption of terminals and wide coverage.

The LTE is a system in which a plurality of mobile stations communicate with each other by sharing one or more physical channels in both uplink and downlink.

A channel shared by a plurality of mobile stations is generally called a shared channel, which is, in the LTE system, a "Physical Uplink Shared Channel (PUSCH)" in the uplink and a "Physical Downlink Shared Channel (PDSCH)" in the downlink.

Also, such a shared channel is, as a transport channel, an "Uplink Shared Channel (UL-SCH)" in the uplink and a "Downlink Shared Channel (DL-SCH)" in the downlink.

In such a communication system using shared channels described above, it is necessary to select which mobile station UE the shared channel is to be allocated to, and to signal information indicating that the shared channel is allocated to the selected mobile station UE, for each sub-frame (1 ms, in the LTE).

In the LTE, a control channel used for the signaling is called the "Physical Downlink Control Channel (PDCCH)" or "Downlink L1/L2 Control Channel (DL L1/L2 Control Channel)".

Meanwhile, the processing for each sub-frame of selecting which mobile station UE the shared channel is to be allocated to is generally called the "scheduling". In this case, the processing may also be called the "dynamic scheduling", because the mobile station UE to which the shared channel is allocated is dynamically selected for each sub-frame. Furthermore, "allocating the shared channel" described above may be alternatively expressed as "allocating a radio resource for the shared channel".

Information of the physical downlink control channel includes, for example, the "downlink scheduling information", "the uplink scheduling grant", and the like.

The downlink scheduling information includes, for example, downlink resource block allocation information on the downlink shared channel, ID of UE, the number of streams, information on the precoding vector, data size, modulation scheme, information on the HARQ (hybrid automatic repeat request), and the like.

Meanwhile, the "uplink scheduling grant" includes, for example, uplink resource block allocation information on the uplink shared channel, ID of UE, data size, modulation scheme, uplink transmission power information, information on demodulation reference signal in the uplink MIMO, and the like.

Note that, the "downlink scheduling information" and the "uplink scheduling grant" described above may be collectively referred to as "downlink control information (DCI)".

In the LTE system, the HARQ is applied to a communication using the shared channel described above. For example, on the downlink, the mobile station UE decodes the downlink shared channel and sends the radio base station eNB acknowledgement information (ACK/NACK) based on the decoding result (CRC check result) using the physical uplink control channel (PUCCH).

Then, the radio base station eNB performs retransmission control according to a content of the acknowledgement information, which is expressed either with a positive response (ACK) indicating that the transmitted signal is received properly or a negative response (NACK) indicating that the transmitted signal is not received properly.

FIG. 8 shows the downlink dynamic scheduling and the HARQ processing in the LTE mobile communication system described above.

In the sub-frame #3, the radio base station eNB transmits downlink scheduling information via the PDCCH and downlink data via the PDSCH to the mobile station UE.

Then, the mobile station UE receives downlink data via PDSCH on the basis of the downlink scheduling information received via PDCCH.

In the sub-frame #7, the mobile station UE transmits the acknowledgement information for the downlink data using PUCCH, and the radio base station eNB receives the acknowledgement information (ACK/NACK) mapped to the PUCCH.

The radio resource of the PDSCH described above is dynamically allocated as being notified by the PDCCH. Also, the radio resource of PUCCH described above is associated with the radio resource number of PDCCH described above. Dynamic allocation of such radio resource of PDCCH also results in dynamic allocation of such radio resource of PUCCH.

That is, in the normal downlink scheduling of the LTE mobile communication system, the radio base station eNB is configured to dynamically allocate a downlink radio resource and an uplink radio resource to the mobile station UE through the PDCCH, the downlink radio resource being for transmitting downlink data to the mobile station UE while the uplink radio resource being for transmitting acknowledgement information for the downlink data.

Furthermore, in the dynamic scheduling described above, a time difference is fixed between a sub-frame in which a PUCCH signal is transmitted and a sub-frame in which a PDCCH signal and a PDSCH signal are transmitted.

On the other hand, in the "persistent scheduling" that is under consideration to achieve the VoIP and the like, the radio base station eNB is configured to fixedly allocate the downlink radio resource (PDSCH) to a mobile station in first cycles starting from a sub-frame (first allocation starting time) in which the downlink scheduling information is transmitted to the mobile station UE through the PDCCH, and to fixedly allocate the uplink radio resource (PUCCH) to the mobile station UE through the upper layer (Radio Resource Control: RRC) signaling.

In the "persistent scheduling", the downlink scheduling information is transmitted via PDCCH in a first transmission only, and the downlink scheduling information is not transmitted via PDCCH in the subsequent transmissions. For this reason, the method for associating a radio resource of the PUCCH with a radio resource number of the PDCCH cannot be applied unlike the "dynamic scheduling" described above.

Accordingly, the uplink radio resource (PUCCH) in the "persistent scheduling" is fixedly allocated to the mobile station UE by using the upper layer (RRC) signaling.

Here, the uplink radio resource represents, for example, a code resource in the code multiplexing or a frequency resource in the frequency multiplexing.

The frequency resource may be designated by a resource block number of a resource block (aggregate of sub-carriers) in which the PUCCH is transmitted.

Furthermore, when a plurality of pieces of acknowledgement information are multiplexed within one resource block, the uplink radio resource may be designated by a predetermined identification number. For example, an identification number may be used to designate an amount of cyclic shift in the multiplexing of CAZAC sequence cyclic shift or an orthogonal cover number in the block spreading.

Furthermore, generally in the HARQ, a time difference is fixed between a time point where the downlink radio resource (PDSCH) is allocated and a time point where the uplink radio resource (PUCCH) is allocated. Accordingly, a transmission timing of PUCCH is uniquely determined by designating a first allocation starting time through the PDCCH.

In the example shown in FIG. 9, the downlink radio resource (PDSCH) described above is fixedly allocated in cycles of 20 ms, and the uplink radio resource (PUCCH) is fixedly allocated for respective downlink radio resources (PDSCH).

Specifically, the downlink radio resource (PDSCH) is fixedly allocated in sub-frames #3, #23, . . . , while the acknowledgement information is transmitted in sub-frames #7, #27, . . . .

Note that, in the sub-frame #3 of the example shown in FIG. 9, a first allocation starting time is designated by PDCCH.

Here, in a prior art, a time difference between a time point where the downlink radio resource (PDSCH) described above is allocated and a time point where the uplink radio resource (PUCCH) is allocated, is provided to become a predetermined period of time (for example, four sub-frames).

Accordingly, when a timing of the downlink radio resource (PDSCH) allocated in the "persistent scheduling" is changed, a timing allocated to the uplink radio resource (PUCCH) is also changed similarly.

Note that, even in the case where a timing for allocating the uplink radio resource (PUCCH) is changed, an uplink radio resource (PUCCH) such as a code resource and a frequency resource is not changed. This is because, in the persistent scheduling, the uplink radio resource (PUCCH) such as a code resource in the code multiplexing and a frequency resource in the frequency multiplexing is fixedly allocated to the mobile station UE by using the upper layer signaling as described above.

At this time, if an uplink radio resource (PUCCH) to be allocated at a changed timing is already used by a different mobile station UE, the uplink radio resource (PUCCH) after the change collides with an uplink radio resource (PUCCH) of the different mobile station UE. Thus, there has been a problem that changing the timing of the downlink radio resource (PDSCH) allocated in the "persistent scheduling" cannot be processed.

In other words, there has been a problem that a timing of the downlink radio resource (PDSCH) allocated in the "persistent scheduling" cannot be changed freely, since a time difference is fixed between a time point where the downlink radio resource (PDSCH) is allocated and a time point where the uplink radio resource (PUCCH) is allocated, and the uplink radio resource (PUCCH) is set in advance.

DISCLOSURE OF THE INVENTION

Accordingly, the present invention has been made to solve the above problems. An object of the present invention is to provide a radio resource selecting method, a mobile station and a radio base station which are capable of flexibly setting a timing of a downlink radio resource (PDSCH) allocated in the "persistent scheduling".

A first aspect of the present invention is summarized as a mobile communication method in which a mobile station receives downlink data transmitted from a radio base station by using a downlink radio resource fixedly allocated in first cycles starting from a first allocation starting time, and transmits acknowledgement information for the downlink data using a fixedly allocated uplink radio resource, the method including the steps of: (A) notifying, from the radio base station to the mobile station, the first cycle and information on the uplink radio resource; and (B) determining, at the mobile station, a first allocation starting time, receiving the downlink data via the downlink radio resource and transmitting the acknowledgement information via the uplink radio resource at and after the first allocation starting point, when receiving the fixed allocation signal from the radio base station. In the step (B), the uplink radio resource is adjusted by an adjustment signal included in the fixed allocation signal and the acknowledgement information is transmitted via the adjusted uplink radio resource.

In the first aspect of the present invention, in the step (A), the information on the uplink radio resource may be an identification number which designates a number of the orthogonal cover sequence in the block spreading or an amount of cyclic shift of the CAZAC sequence.

In the first aspect of the present invention, in the step (B), the uplink radio resource may be adjusted by changing the identification number by the adjustment signal.

In the first aspect of the present invention, in the step (B), when a signal format of the fixed allocation signal is the same as a signal format of the dynamic allocation signal used in a scheduling in which the downlink radio resource is dynamically allocated, the adjustment signal may be notified with a power control command or a bit designating the redundancy version of the HARQ contained in the dynamic allocation signal.

In other words, the first aspect of the present invention is summarized as a radio resource selecting method for selecting, semi-fixedly, a radio resource to be allocated to an uplink response signal indicating a reception state of a fixedly allocated downlink signal, from a plurality of radio resources defined successively on a radio resource space formed with the frequency axis and the code axis, the method including the steps of: (A) generating specification information for specifying, from the plural radio resources, allocation radio resources to be allocated to the uplink response signal; (B) notifying the generated specification information; and (C) selecting the allocation radio resources on the basis of the notified specification information. In the step (A), when the plurality of radio resources are classified into a plurality of groups, basic specification information for specifying a group including one or more unused allocation radio resources and one or more pieces of relative specification information indicating a relative position of one or more allocation radio resources within the group on the radio resource space are generated as the specification information.

A second aspect of the present invention is summarized as a mobile station configured to receive downlink data transmitted from a radio base station using a downlink radio resource fixedly allocated in first cycles starting from a first allocation starting time and transmit acknowledgement information for the downlink data using a fixedly allocated uplink radio resource, the mobile station including: a fixed communication information receiver unit configured to receive the first cycle and the information on the uplink radio resource from the radio base station; and a communication unit configured to determine the first allocation starting time, receive the downlink data via the downlink radio resource and transmit the acknowledgement information via the uplink radio resource at and after the first allocation starting time, when receiving a fixed allocation signal from the radio base station. The communication unit is configured to adjust the uplink radio resource by the adjustment signal included in the fixed allocation signal and to transmit the acknowledgement information via the adjusted uplink radio resource.

In the second aspect of the present invention, the information on the uplink radio resource may be an identification number which designates a number of the orthogonal cover sequence in the block spreading or an amount of cyclic shift of the CAZAC sequence.

In the second aspect of the present invention, the communication unit may be configured to adjust the uplink radio resource by changing the identification number with the adjustment signal.

In the second aspect of the present invention, when a signal format of the fixed allocation signal is the same as a signal format of the dynamic allocation signal used in a scheduling in which the downlink radio resource is dynamically allocated, the communication unit may be configured to obtain the adjustment signal on the basis of a power control command or a bit designating the redundancy version of the HARQ contained in the dynamic allocation signal.

In other words, the second aspect of the present invention is summarized as a mobile station used in a mobile communication system in which a radio resource to be allocated to an uplink response signal indicating a reception state of a fixedly allocated downlink signal is semi-fixedly selected from a plurality of radio resources defined successively on a radio resource space formed with the frequency axis and the code axis, the mobile station including: a specification information receiver unit configured to receive, from the radio base station, specification information for specifying allocation radio resources to be allocated to the uplink response signal; and a radio resource selector unit configured to select the allocation radio resources on the basis of the specification information received by the specification information receiver unit. When the plurality of radio resources are classified into a plurality of groups, the specification information is configured to include basic specification information for specifying a group including one or more unused allocation radio resources, and one or more pieces of relative specification information indicating a relative position of one or more allocation radio resources within the group on the radio resource space.

A third aspect of the present invention is summarized as a radio base station used in a mobile communication system in which a mobile station receives downlink data transmitted from the radio base station by using a downlink radio resource fixedly allocated in first cycles starting from a first allocation starting time and transmits acknowledgement information for the downlink data by using a fixedly allocated uplink radio resource, the radio base station including: a fixed communication information transmitter unit configured to notify the mobile station of the first cycle and the information on the uplink radio resource; a fixed allocation signal transmitter unit configured to transmit a fixed allocation signal to the mobile station; and a communication unit configured to transmit the downlink data via the downlink radio resource and receive the acknowledgement information via the uplink radio resource at and after a first allocation starting time determined by the fixed allocation signal. The communication unit is configured to adjust the uplink radio resource by an adjustment signal included in the fixed allocation signal and to receive the acknowledgement information via the adjusted uplink radio resource.

In the third aspect of the present invention, the information on the uplink radio resource may be an identification number which designates a number of the orthogonal cover sequence in the block spreading or an amount of cyclic shift of the CAZAC sequence.

In the third aspect of the present invention, the communication unit may be configured to adjust the uplink radio resource by changing the identification number with the adjustment signal.

In the third aspect of the present invention, when a signal format of the fixed allocation signal is the same as a signal format of the dynamic allocation signal used in a scheduling in which the downlink radio resource is dynamically allocated, the communication unit may be configured to notify the adjustment signal by a power control command or a bit designating the redundancy version of the HARQ included in the dynamic allocation signal.

In the third aspect of the present invention, the fixed allocation signal transmitter unit may be configured to set the adjustment signal in such a manner that the uplink radio resource does not collide with an uplink radio resource allocated to another mobile station.

In other words, the third aspect of the present invention is summarized as a radio base station configured to select, semi-fixedly, a radio resource to be allocated to an uplink response signal indicating a reception state of a fixedly allocated downlink signal, from a plurality of radio resources defined successively on a radio resource space formed with the frequency axis and the code axis, the radio base station including: an specification information generator unit configured to generate specification information for specifying, from the plurality of radio resources, allocation radio resources to be allocated to the uplink response signal; and an specification information notifying unit configured to notify the generated specification information. When the plurality of radio resources are classified into a plurality of groups, the specification information generator unit is configured to generate, as the specification information, basic specification information for specifying a group including one or more unused allocation radio resources and one or more pieces of relative specification information indicating a relative position of one or more allocation radio resources within the group on a radio resource space.

BEST MODES FOR CARRYING OUT THE INVENTION (Configuration of Mobile Communication System According to First Embodiment of Present Invention)

Figure 1:
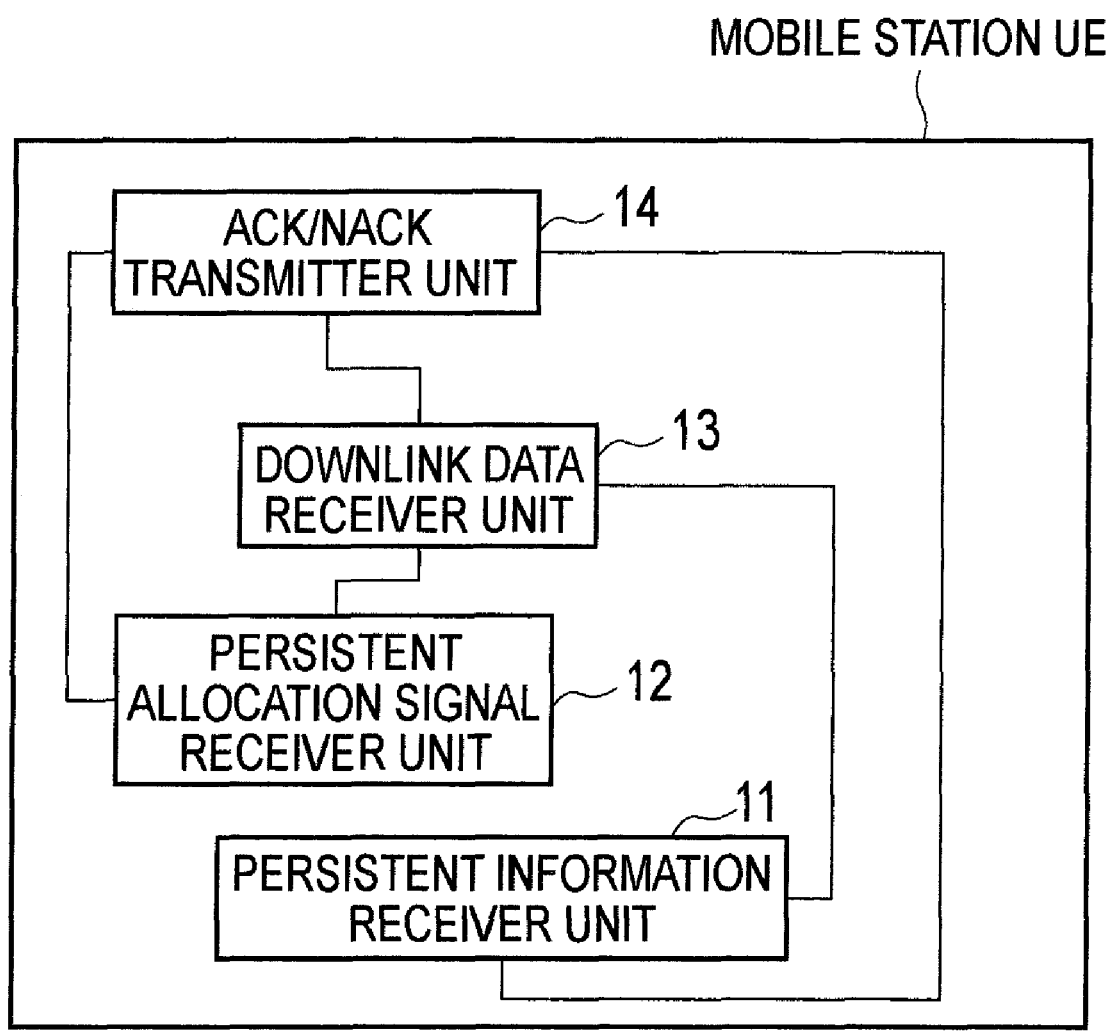
FIG. 1 is a functional block diagram of a mobile station according to a first embodiment of the present invention.
Figure 2:
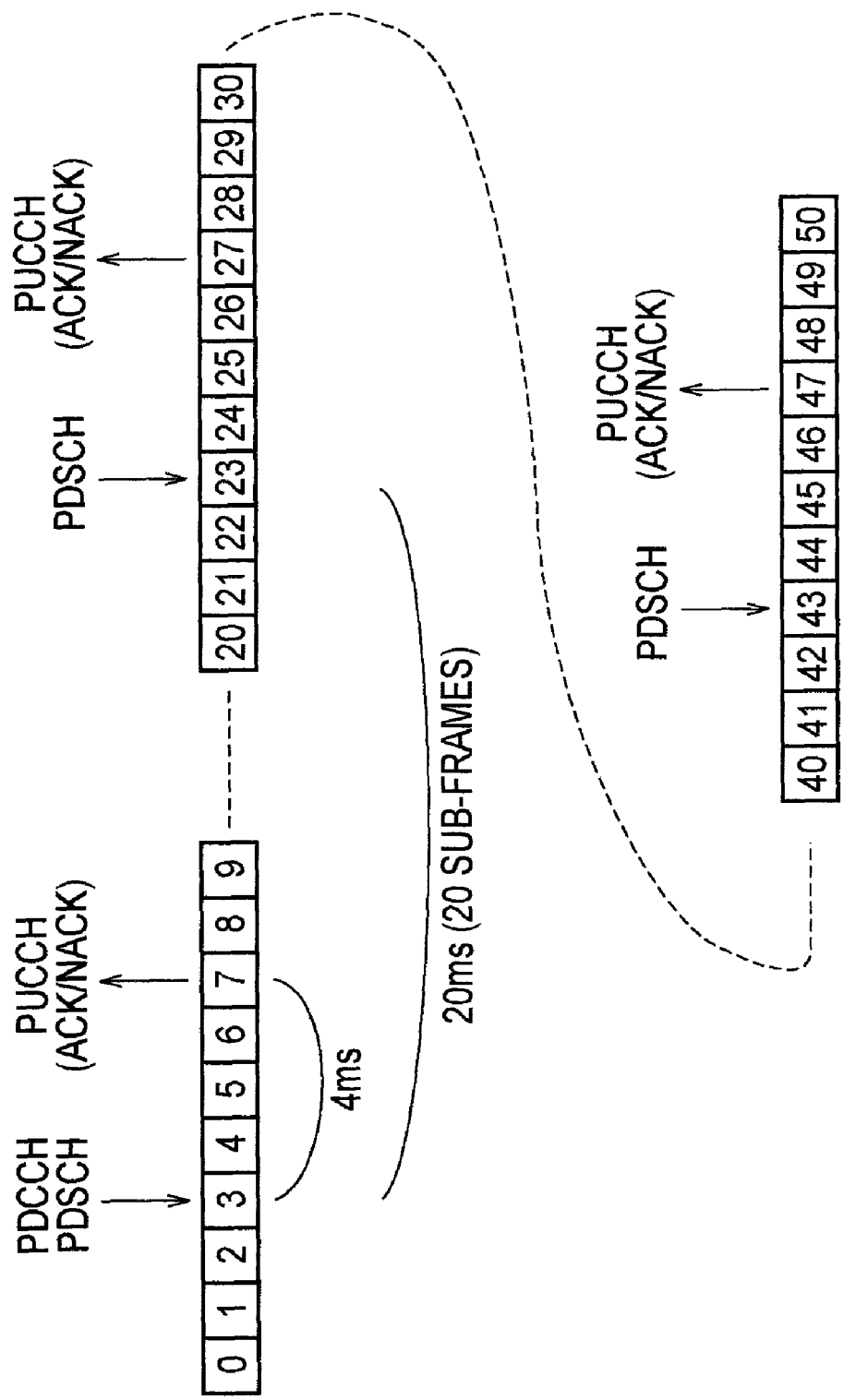
FIG. 2 is a diagram for explaining a scheduling performed in a mobile communication system according to the first embodiment of the present invention.

Referring to FIG. 1 and FIG. 2, a configuration of a mobile communication system according to a first embodiment of the present invention is described. This embodiment is described by citing the LTE mobile communication system, but the present invention can also be applied to mobile communication systems to which any other mode is applied.

In a mobile communication system according to this embodiment, the mobile station UE is configured to receive downlink data transmitted from the radio base station eNB using a downlink radio resource (PDSCH) fixedly allocated in first cycles starting from a first allocation starting time, and transmit acknowledgement information (ACK/NACK) for the downlink data by using an uplink radio resource (PUCCH).

Here, a time difference is fixed between a reception timing of the downlink data and a transmission timing of the acknowledgement information.

As shown in FIG. 1, the mobile station UE includes a persistent information receiver unit 11, a persistent allocation signal receiver unit 12, a downlink data receiver unit 13 and an ACK/NACK transmitter unit 14.

The persistent information receiver unit 11 is configured to receive, from the radio base station eNB, persistent information (fixed communication information) including the first cycle and the information on the uplink radio resource (PUCCH).

Specifically, the persistent information receiver unit 11 is configured to acquire the persistent information based on an RRC message transmitted by the radio base station eNB.

Here, the information on the uplink radio resource (PUCCH) represents, for example, a resource block number of a resource block (aggregate of sub-carriers) in which PUCCH is transmitted or an identification number of a plurality of pieces of acknowledgement information multiplexed within one resource block.

For example, an amount of cyclic shift in the multiplexing of the CAZAC sequence cyclic shift or an orthogonal cover number in the block spreading may be designated by such identification number.

Meanwhile, the information on the uplink radio resource (PUCCH) described above may be in any form as long as the radio resource can be identified.

For example, the information on the uplink radio resource (PUCCH) may be an identification number of a code resource in the code multiplexing described above, an identification number of a frequency resource in the frequency multiplexing, an identification number of a time resource in the time multiplexing, or an identification number of a resource in a hybrid multiplexing such as the code multiplexing, the frequency multiplexing and the time multiplexing described above.

Furthermore, such information on the uplink radio resource (PUCCH) is given to the ACK/NACK transmitter unit 14.

Furthermore, in the LTE mobile communication system, information on the first allocation starting time described above is not included in such persistent information.

This is intended to make the radio base station eNB flexibly determine a time resource to allocate the downlink radio resource (PDSCH) described above, whereby utilization efficiency of the radio resource is improved when the "persistent scheduling" is applied.

Meanwhile, it is not necessary that transmission timing of the uplink radio resource (PUCCH) is included as the persistent information, since this information is uniquely determined based on a reception timing of the downlink radio resource (PDSCH) described above and a fixedly defined time offset.

For example, transmission timing of the uplink radio resource (PUCCH) may be defined as follows:

(Transmission timing of uplink radio resource (PUCCH))=(reception timing of downlink radio resource PDSCH))+4ms Meanwhile, the above value of 4 ms is just an example and therefore may be other than 4 ms. Alternatively, 4 ms may be expressed as four sub-frames.

The persistent allocation signal receiver unit 12 is configured to receive a fixed allocation signal from the radio base station eNB.

Specifically, the persistent allocation signal receiver unit 12 is configured to receive, from the radio base station eNB, PDCCH instructing fixed allocation of the downlink radio resource (PDSCH) for the "persistent scheduling", as a fixed allocation signal.

For example, the persistent allocation signal receiver unit 12 may be configured to determine, on the basis of RNTI or the like set to PDCCH, whether the PDCCH is a PDCCH to instruct fixed allocation of the downlink radio resource (PDSCH) for the "persistent scheduling" or a PDCCH to dynamically allocate the downlink radio resource (PDSCH) for normal downlink scheduling.

Meanwhile, the persistent allocation signal receiver unit 12 may be configured to determine, on the basis of one specific bit in the PDCCH, whether the PDCCH is a PDCCH to instruct fixed allocation of the downlink radio resource (PD- SCH) for the "persistent scheduling" or a PDCCH to dynamically allocate the downlink radio resource (PDSCH) for normal downlink scheduling.

Alternatively, when the persistent allocation signal receiver unit 12 is configured to indicate whether a part of information elements in a PDCCH is a PDCCH to instruct fixed allocation of the PDSCH (the downlink radio resource) for the "persistent scheduling", or the part of information elements in the PDCCH is a PDCCH to dynamically allocating the PDSCH (the downlink radio resource) for the normal downlink scheduling, the persistent allocation signal receiver unit 12 may be configured to determine whether the PDCCH is a PDCCH to instruct fixed allocation of the PDSCH (the downlink radio resource) for the "persistent scheduling", or the PDCCH is a PDCCH to dynamically allocating the PDSCH (the downlink radio resource) for the normal downlink scheduling, on the basis of the part of information elements in the above PDCCH.

Furthermore, the fixed allocation signal includes, in addition to the information to instruct fixed allocation of the downlink radio resource (PDSCH) for the "persistent scheduling", an uplink radio resource adjustment signal for adjusting a resource block number of the uplink radio resource (PUCCH) and the identification number when plural pieces of acknowledgement information are multiplexed within one resource block. Details of the uplink radio resource will be described later.

Such an uplink radio resource adjustment signal is given to the ACK/NACK transmitter unit 14.

The downlink data receiver unit 13 is configured to receive downlink data transmitted via the downlink radio resource (PDSCH) allocated by the PDCCH.

Specifically, the downlink data receiver unit 13 is configured to, when the persistent allocation signal (fixed allocation signal) is received by the persistent allocation signal receiver unit 12, determine a sub-frame, which has received such PDCCH, as a first allocation starting time, and receive the downlink data via the downlink radio resource (PDSCH) for "persistent scheduling" fixedly in the first cycles starting from the first allocation starting time.

In the example shown in FIG. 2, since the persistent allocation signal receiver unit 12 has received the persistent allocation signal via PDCCH, the downlink data receiver unit 13 is configured to receive the downlink data via the downlink radio resource (PDSCH) mapped to a resource block (aggregate of sub-carriers) within the sub-frame #3 designated by PDCCH.

Furthermore, the downlink data receiver unit 13 is configured to receive downlink data via a downlink radio resource (PDSCH) mapped to a resource block (aggregate of sub-carriers) designated by the PDCCH in the cycle of 20 ms starting from the sub-frame #3.

That is, the downlink data receiver unit 13 is configured to receive downlink data via the PDSCH (downlink radio resource) mapped to a resource block (aggregate of sub-carriers) designated by the PDCCH in sub-frames #3, #23, #43, ....

The ACK/NACK transmitter unit 14 is configured to receive, from the persistent information receiver unit 11, information on an uplink radio resource (PUCCH) notified by the persistent information.

Furthermore, the ACK/NACK transmitter unit 14 receives, from the persistent allocation signal receiver unit 12, an uplink radio resource adjustment signal described above for adjusting a resource block number of the PUCCH (uplink radio resource) and the identification number when a plurality of pieces of acknowledgement information are multiplexed within one resource block.

The ACK/NACK transmitter unit 14 is configured to determine an uplink radio resource (PUCCH) based on the information on the uplink radio resource (PUCCH) notified by the persistent information and the uplink radio resource adjustment signal, and to transmit the acknowledgement information (ACK/NACK) for the downlink data received via the uplink radio resource (PUCCH). The acknowledgement information (ACK/NACK) is determined on the basis of decoding results of the downlink data in the downlink data receiver unit 13.

Hereinafter, using FIG. 3, description is given of a method for determining the uplink radio resource (PUCCH) based on the information on the uplink radio resource (PUCCH) notified by the persistent information and the uplink radio resource adjustment signal.

Figure 3:
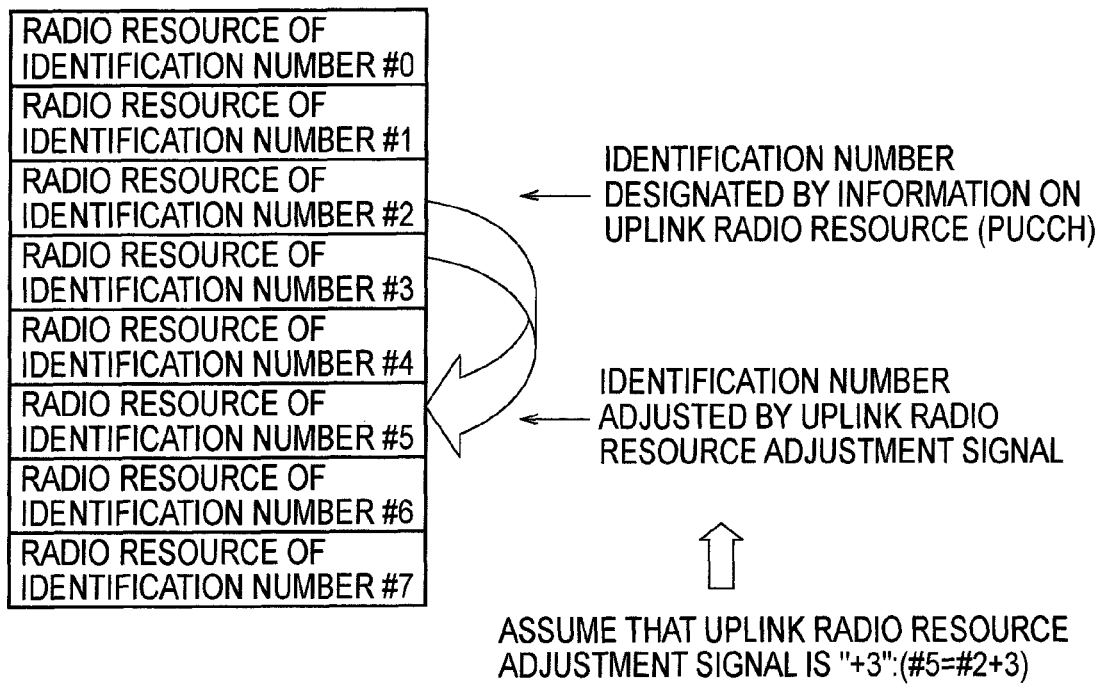
FIG. 3 is a diagram for explaining a method of determining an uplink radio resource (PUCCH) performed in a mobile communication system according to the first embodiment of the present invention.

In FIG. 3, eight radio resources are defined as uplink radio resources (PUCCH), and #0, #1, #2, ... #7 are defined as corresponding identification numbers thereof. For example, such identification numbers may be identification numbers in the multiplexing of a plurality of pieces of acknowledgement information within one resource block described above.

Then, assume the case where a radio resource of identification number #2 is designated by the information on the uplink radio resource (PUCCH) notified by the persistent information and "+3" is designated by the uplink radio resource adjustment signal.

In this case, the ACK/NACK transmitter unit 14 determines a radio resource of the identification number #5 as a radio resource for transmitting the acknowledgement information (ACK/NACK) for the received downlink data, that is, as an uplink radio resource (PUCCH), by adding "+3" to the identification number #2.

That is, a radio resource designated by the information on the uplink radio resource (PUCCH) notified by the persistent information is adjusted by the uplink radio resource adjustment signal described above.

Meanwhile, in the example described above, the identification number in the multiplexing of a plurality of pieces of acknowledgement information within one resource block is adjusted by the uplink radio resource adjustment signal, but, instead, the resource block number of the PUCCH may be adjusted by the uplink radio resource adjustment signal.

Alternatively, both the identification number in the multiplexing of a plurality of pieces of acknowledgement information within one resource block and a resource block number of the PUCCH may be adjusted by the uplink radio resource adjustment signal described above.

Alternatively, an identification number for identifying a resource other than the above may be defined, and such identification number may be adjusted by the uplink radio resource adjustment signal described above.

Furthermore, although the identification number described above is adjusted just by "+3" by the uplink radio resource adjustment signal, such "+3" is just an example and, therefore, may be a value other than "+3" such as "+2" or "+4", or a negative value such as "−3" or "−2". Alternatively, the identification number may be "0". Further alternatively, the uplink radio resource adjustment signal may be a signal having a significance other than described above as long as such identification number can be adjusted.

Furthermore, although eight radio resources are defined in the example described above, a similar uplink radio resource (PUCCH) determining method is also applicable to a case where other than eight radio resources are defined.

Meanwhile, although, in the above example, an identification number designated by the information on the uplink radio resource (PUCCH) notified by the persistent information is adjusted by the uplink radio resource adjustment signal, instead, an identification number of the uplink radio resource (PUCCH) used in a previous "Talk Spurt" may be adjusted by the uplink radio resource adjustment signal, and a radio resource of the adjusted identification number may be used as an uplink radio resource (PUCCH).

In this case, only when the uplink radio resource (PUCCH) is transmitted for the first time, an identification number designated by the information on the uplink radio resource (PUCCH) notified by the persistent information is adjusted by the uplink radio resource adjustment signal.

Alternatively, although, in the example described above, an identification number designated by the information on the uplink radio resource (PUCCH) notified by the persistent information is adjusted by the uplink radio resource adjustment signal, instead, depending on the persistent information, information on the uplink radio resource (PUCCH) may be notified by the PDCCH without notifying the information on the uplink radio resource (PUCCH).

In this case, there is a disadvantage of increasing the bit number for the information on the uplink radio resource (PUCCH), while there is an advantage in that the uplink radio resource (PUCCH) can be set up flexibly.

Furthermore, in the above example, the information on the uplink radio resource (PUCCH) notified by the PDCCH may be, for example, information of "identification #2" and "+3", or may be, more directly, information of "identification number #5".

Meanwhile, the uplink radio resource adjustment signal is defined as a part of the information elements notified by the persistent allocation signal (fixed allocation signal).

Here, for example, when a signal format of the persistent allocation signal is the same as a signal format of the dynamic allocation signal in the dynamic scheduling, bits of the power control command used for transmission power control in the dynamic allocation signal may be used as the uplink radio resource adjustment signal.

In the persistent scheduling, since there is less significance of notifying the power control command used in such transmission power control, bits of the command used for transmission power control may be used as the uplink radio resource adjustment signal.

Alternatively, when a signal format of the persistent allocation signal is the same as a signal format of the dynamic allocation signal in the dynamic scheduling, bits designating the "redundancy version" in the dynamic allocation signal may be used as the uplink radio resource adjustment signal.

In the persistent scheduling, since there is less significance of notifying a bit designating such redundancy version, bits of the redundancy version used for transmission power control may be used as the uplink radio resource adjustment signal.

In this case, the redundancy version is a predetermined redundancy version.

Alternatively, when a signal format of the persistent allocation signal is the same as a signal format of the dynamic allocation signal in the dynamic scheduling, bits designating the "MCS (Modulation and Coding Scheme)" in the dynamic allocation signal may be used as the uplink radio resource adjustment signal.

Since the bit number designating such MCS in the persistent scheduling is smaller compared with the dynamic scheduling, a part of such bits designating MCS may be used as the uplink radio resource adjustment signal.

Meanwhile, a timing when the acknowledgement information (ACK/NACK) for the downlink data received via the uplink radio resource (PUCCH) is a timing uniquely determined based on the reception timing of the downlink radio resource (PDSCH) and the fixedly defined time offset, as described above.

Furthermore, in the example described above, although the acknowledgement information (ACK/NACK) for the PDSCH (downlink data) is transmitted by the PUCCH, the acknowledgement information for the downlink data may be transmitted by multiplexing with PUSCH, when a physical uplink shared channel for transmitting uplink data is transmitted in a sub-frame when the acknowledgment information (ACK/NACK) is transmitted.

Alternatively, when a physical uplink shared channel for transmitting uplink data in a sub-frame when the acknowledgement information (ACK/NACK) is transmitted is allocated, acknowledgement information for such downlink data may be transmitted as partial information within the PUSCH.

On the other hand, the radio base station eNB according to the present invention is configured to notify the mobile station UE of the first cycle and the information on an uplink radio resource (PUCCH).

Description of such information on the uplink radio resource (PUCCH) is omitted as it is the same as the description given of the mobile station UE.

Figure 4:
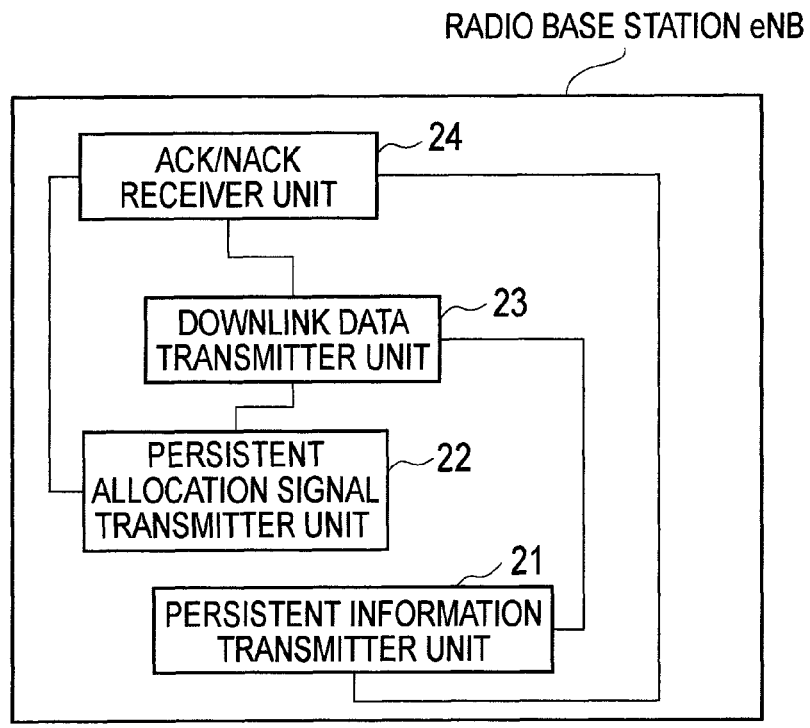
FIG. 4 is a functional block diagram of a radio base station according to the first embodiment of the present invention.

As shown in FIG. 4, the radio base station eNB includes a persistent information transmitter unit 21, a persistent allocation signal transmitter unit 22, a downlink data transmitter unit 23 and an ACK/NACK receiver unit 24.

The persistent information transmitter unit 21 is configured to transmit, to the mobile station UE, persistent information (fixed communication information) including the first cycle and the information on the uplink radio resource (PUCCH).

Specifically, the persistent information transmitter unit 21 is configured to notify the mobile station UE of the persistent information using an RRC message.

Description of the information on the uplink radio resource (PUCCH) is omitted as it is the same as the description given of the mobile station UE. Meanwhile, such information on the uplink radio resource (PUCCH) is given to the ACK/NACK receiver unit 24.

The persistent allocation signal transmitter unit 22 is configured to transmit a fixed allocation signal from the mobile station UE.

Specifically, the persistent allocation signal transmitter unit 22 is configured to transmit, to the mobile station UE, a PDCCH instructing fixed allocation of the downlink radio resource (PDSCH) for the "persistent scheduling", as a fixed allocation signal.

Note that, such a fixed allocation signal includes, in addition to the information to instruct fixed allocation of the downlink radio resource (PDSCH) for the "persistent scheduling", an uplink radio resource adjustment signal for adjusting a resource block number of the uplink radio resource (PUCCH) and the identification number when a plurality of pieces of acknowledgement information are multiplexed within one resource block.

Such an uplink radio resource adjustment signal is given to the ACK/NACK receiver unit 24.

Additionally, the persistent allocation signal transmitter unit 22 may be configured to determine contents of the uplink radio resource adjustment signal in such a manner that the radio resource of the acknowledgement information for the downlink data does not collide with an acknowledgement information transmitted from another mobile station.

Figure 5:
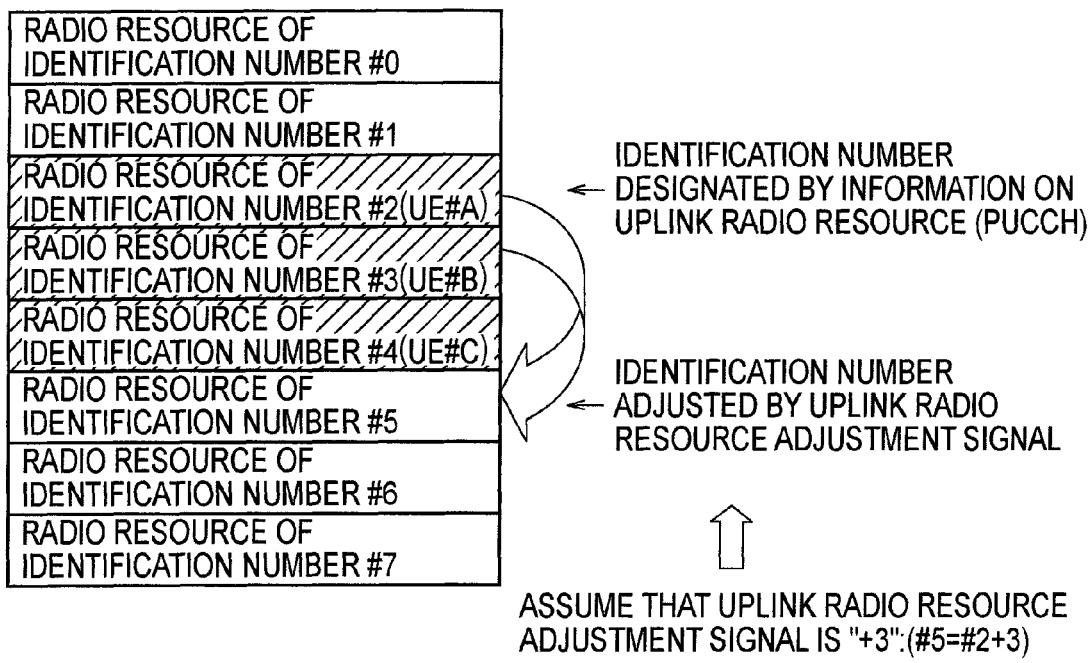
FIG. 5 is a diagram for explaining a method of determining contents of the uplink radio resource adjustment signal, performed in a mobile communication system according to the first embodiment of the present invention.

Using FIG. 5, one example of a method for determining contents of the uplink radio resource adjustment signal is shown, wherein the contents are determined in such a manner that a radio resource of acknowledgement information for the downlink data does not collide with a radio resource of the acknowledgement information transmitted from another mobile station.

In FIG. 5, eight radio resources are defined as uplink radio resources (PUCCH), and #0, #1, #2, . . . #7 are defined as corresponding identification numbers thereof.

Additionally, in the transmission timing of the acknowledgement information, radio resources of identification numbers #2, #3, and #4 are already used by other mobile stations UE#A, UE#B and UE#C.

In this case, when the identification number of the uplink radio resource (PUCCH) of the mobile station UE is not adjusted by the uplink radio resource adjustment signal, an uplink radio resource (PUCCH) transmitted by a different mobile station UE#A collides with an uplink radio resource (PUCCH) transmitted by the mobile station UE, whereby transmission characteristics of uplink radio resources (PUCCH) of the different mobile station UE#A and the mobile station UE degrade significantly.

Accordingly, the persistent allocation signal transmitter unit 22 determines that the identification number of the uplink radio resource (PUCCH) of the mobile station UE should be adjusted by "+3" with the uplink radio resource adjustment signal in order to prevent the collision described above.

In this case, the identification number of the uplink radio resource (PUCCH) of the mobile station UE becomes #2+3=#5, so that the uplink radio resource (PUCCH) does not collide with an uplink radio resource (PUCCH) transmitted by other mobile stations UE.

The downlink data transmitter unit 23 is configured to transmit downlink data transmitted via the downlink radio resource (PDSCH) allocated by the PDCCH.

Specifically, the downlink data transmitter unit 23 is configured to, when the persistent allocation signal (fixed allocation signal) is transmitted by the persistent allocation signal transmitter unit 22, determine a sub-frame, which has transmitted such PDCCH, as a first allocation starting time, and transmit the downlink data via the downlink radio resource (PDSCH) for "persistent scheduling" fixedly in the first cycles starting from the first allocation starting time.

The ACK/NACK receiver unit 24 is configured to receive, from the persistent information transmitter unit 21, information on an uplink radio resource (PUCCH) notified by the persistent information.

Furthermore, the ACK/NACK receiver unit 24 receives, from the persistent allocation signal transmitter unit 22, an uplink radio resource adjustment signal described above for adjusting a resource block number of the PUCCH (uplink radio resource) and the identification number when a plurality of pieces of acknowledgement information are multiplexed within one resource block.

The ACK/NACK receiver unit 24 is configured to determine an uplink radio resource (PUCCH) based on the information on the uplink radio resource (PUCCH) notified by the persistent information and the uplink radio resource adjustment signal, and to receive the acknowledgement information (ACK/NACK) for the downlink data transmitted via the uplink radio resource (PUCCH).

Description of the method of determining the information on the uplink radio resource (PUCCH) notified by the persistent information and an uplink resource (PUCCH) based on the uplink radio resource adjustment signal is also omitted as it is the same as the description given of the mobile station UE.

(Operations of Mobile Communication System According to First Embodiment of Present Invention)

Figure 6:
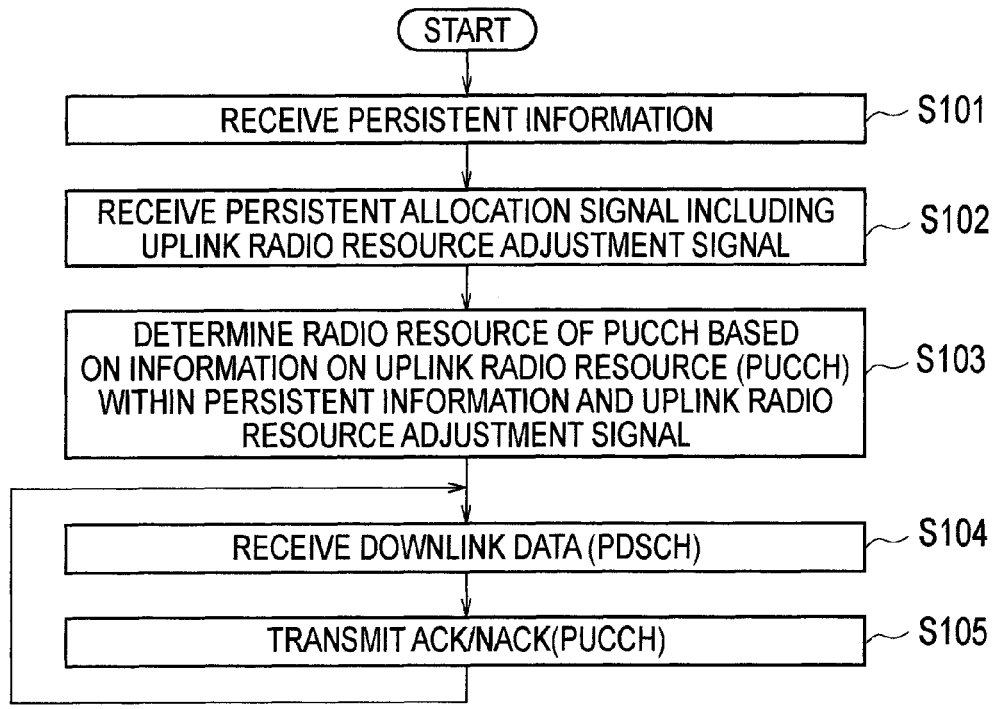
FIG. 6 is a flowchart showing operations of a mobile station according to the first embodiment of the present invention.

Referring to FIG. 6, operations of a mobile communication system according to the first embodiment of the present invention is described.

As shown in FIG. 6, in the step S101, the mobile station UE receives, from the radio base station eNB, persistent information including the first cycle and information on the uplink radio resource (PUCCH) through an RRC message or the like.

In the step S102, the mobile station UE receives the persistent allocation signal (fixed allocation signal) transmitted by the radio base station eNB via the PDCCH. The persistent allocation signal includes the uplink radio resource adjustment signal.

In the step S102, the mobile station UE determines a reception timing of the persistent allocation signal as a first allocation starting time.

In the step S103, the mobile station UE determines an uplink radio resource (PUCCH) based on the information on the uplink radio resource (PUCCH) and the uplink radio resource adjustment signal.

A method for determining the uplink radio resource (PUCCH) based on the information on the uplink radio resource (PUCCH) and the uplink radio resource adjustment signal is the same as a method for determining the uplink radio resource (PUCCH) already described in the ACK/NACK transmitter unit 14 of the mobile station UE.

In the step S104, the mobile station UE receives downlink data via the PDSCH (downlink radio resource) for the "persistent scheduling" designated by the persistent allocation signal at a reception timing of the "persistent scheduling" calculated from the first allocation starting time and the first cycle.

In the step S105, the mobile station UE transmits the acknowledgement information (AK/NACK) for the downlink data received in step S104 via the uplink radio resource (PUCCH) determined in step S103.

Then, the mobile station UE receives downlink data via the PDSCH (downlink radio resource) fixedly allocated in the first cycle (step S104) and transmits the acknowledgement information (AK/NACK) for the downlink data via the PUCCH (uplink radio resource) (step S105).

Figure 7:
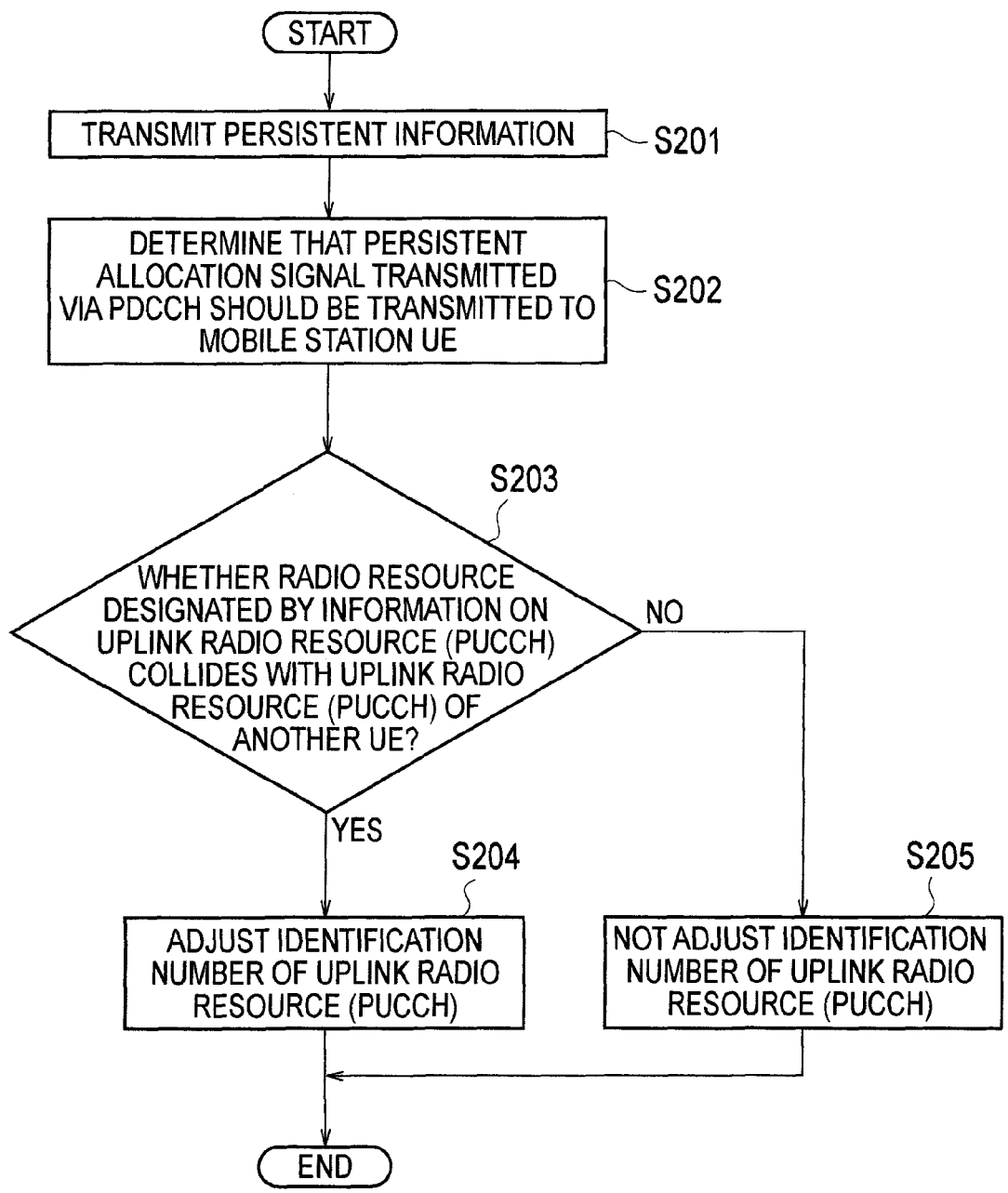
FIG. 7 is a flowchart showing operations of a radio base station according to the first embodiment of the present invention.
Figure 8:
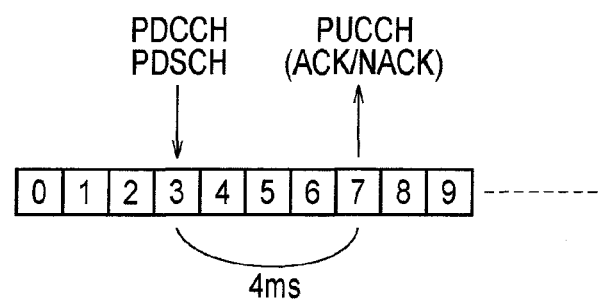
FIG. 8 is a diagram for setting up a scheduling in a general LTE mobile communication system.
Figure 9:
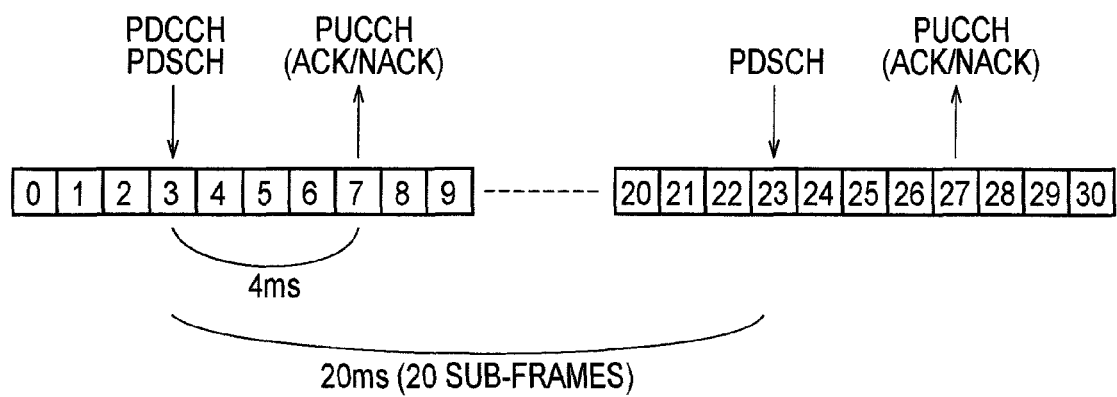
FIG. 9 is a diagram for setting up a scheduling in a general LTE mobile communication system.

Referring to FIG. 7, operations of the radio base station according to the first embodiment of the present invention is described.

As shown in FIG. 7, in the step S201, the radio base station eNB transmits, to the mobile station UE, persistent information including the first cycle and information on the uplink radio resource (PUCCH) through an RRC message or the like.

In step S202, the radio base station eNB determines that the persistent allocation signal (fixed allocation signal) transmitted via the PDCCH should be transmitted to the mobile station UE.

In step S203, the radio base station eNB determines whether or not an uplink radio resource (PUCCH) designated by the information on the uplink radio resource (PUCCH) collides with an uplink radio resource (PUCCH) of a different mobile station UE.

If the radio base station eNB determines that the uplink radio resource (PUCCH) designated by the information on the uplink radio resource (PUCCH) collides with an uplink radio resource (PUCCH) of the different mobile station UE (step S203: YES), operation of the radio base station eNB proceeds to step S204. Otherwise (step S203: NO), operation of the radio base station eNB proceeds to step S205.

In step S204, the radio base station eNB determines that the uplink radio resource (PUCCH) designated by the information on the uplink radio resource (PUCCH) should be adjusted.

Specifically, the radio base station eNB sets up, for example, a value of "+3" as the uplink radio resource adjustment signal. The uplink radio resource adjustment signal is included in the persistent allocation signal determined to be transmitted in step S202.

In step S205, the radio base station eNB determines that the uplink radio resource (PUCCH) designated by information on the uplink radio resource (PUCCH) should not be adjusted.

Specifically, the radio base station eNB sets up, for example, a value of "0" as the uplink radio resource adjustment signal. The uplink radio resource adjustment signal is included in the persistent adjustment signal determined to be transmitted in step S202.

(Advantageous Effects of Mobile Communication System According to First Embodiment of Present Invention)

In a mobile communication system according to the first embodiment of the present invention, when timing to allocate the downlink radio resource (PDSCH) is changed and the uplink radio resource (PUCCH) collides with an uplink radio resource (PUCCH) of another mobile station, the collision can be avoided by adjusting the uplink radio resource (PUCCH), whereby timing of allocating the downlink radio resource (PDSCH) through the "persistent scheduling" can be set flexibly and radio utilization efficiency can be improved.

Features according to this embodiment described above may be expressed as follows.

A first aspect of the present embodiment is summarized as a radio resource selecting method for selecting, semi-fixedly, a radio resource to be allocated to an uplink response signal indicating a reception state of a fixedly allocated downlink signal, from a plurality of radio resources defined successively on a radio resource space formed with the frequency axis and the code axis, the method including the steps of: (A) generating specification information for specifying, from the plurality of radio resources, allocation radio resources to be allocated to the uplink response signal; (B) notifying the generated specification information; and (C) selecting the allocation radio resources on the basis of the notified specification information; and wherein, in the step (A), when the plurality of radio resources are classified into a plurality of groups, basic specification information for specifying a group including one or more unused allocation radio resources and one or more pieces of relative specification information indicating a relative position of one or more allocation radio resources within the group on the radio resource space are generated as the specification information.

Here, the "fixedly allocated downlink signal" corresponds to downlink data transmitted using a downlink radio resource (PDSCH) allocated in the "persistent scheduling".

Also, the "uplink response signal in which a reception state of the downlink signal is indicated" corresponds to an "acknowledgement information for the downlink data" described above.

Also, the "basic specification information" corresponds to the "information on the uplink radio resource (PUCCH)" described above, and the "relative specification information" corresponds to the "uplink radio resource adjustment signal" described above. The "allocation radio resource" corresponds to, for example, respective radio resources shown in FIG. 3.

In the first aspect of the present embodiment, in the step (A), the relative specification information may be generated for unused allocation radio resources.

In the first aspect of the present embodiment, in the step (A), the basic specification information may be frequency information (for example, resource block number) of any of allocation radio resources within the groups.

A second aspect of the present embodiment is summarized as a radio base station configured to select, semi-fixedly, a radio resource to be allocated to an uplink response signal indicating a reception state of a fixedly allocated downlink signal, from a plurality of radio resources defined successively on a radio resource space formed with the frequency axis and the code axis, the radio base station including: a persistent information transmitter unit 21 configured to generate information on an uplink radio resource (PUCCH) (basic specification information), and to notify the generated information on an uplink radio resource (PUCCH); and a persistent allocation signal transmitter unit 22 configured to generate an uplink radio resource adjustment signal (relative specification information), and to notify the generated uplink radio resource adjustment signal.

In the second aspect of the present embodiment, the persistent allocation signal transmitter unit 22 may be configured to generate the uplink radio resource adjustment signal for unused allocation radio resources.

In the second aspect of the present embodiment, the persistent information transmitter unit 21 may be configured to use, as the information on an uplink radio resource (PUCCH), frequency information (for example, resource block number) of any of allocation radio resources within the groups A third aspect of the present embodiment is summarized as a mobile station UE used in a mobile communication system in which a radio resource to be allocated to an uplink response signal indicating a reception state of a fixedly allocated downlink signal is semi-fixedly selected from a plurality of radio resources defined successively on a radio resource space formed with the frequency axis and the code axis, the mobile station UE including: a persistent information receiver unit 11 configured to receive, from a radio base station eNB, information on an uplink radio resource (PUCCH) (specification information); and a persistent allocation signal receiver unit configured to receive, from the radio base station eNB, an uplink radio resource adjustment signal (relative specification information); and an ACK/NACK transmitter unit 14 configured to select an allocation radio resource on the basis of the received information on an uplink radio resource (PUCCH) and the received uplink radio resource adjustment signal.

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, the present invention can provide a mobile communication method, a mobile station and a radio base station which are capable of flexibly setting a timing of a downlink radio resource (PDSCH) allocated in the "persistent scheduling".

The invention claimed is:

1. A radio resource selecting method for selecting a radio resource to be allocated to an uplink response signal indicating a reception state of a downlink signal, from a plurality of radio resources defined successively on a radio resource space formed with the frequency axis and the code axis, the method comprising the steps of:
    (A) generating first specification information for specifying, from the plurality of radio resources, radio resources to be allocated to the uplink response signal;
    (B) notifying the generated first specification information;
    (C) generating second specification information for specifying, from the plurality of radio resources, radio resources to be allocated to the uplink response signal;
    (D) notifying the generated second specification information; and
    (E) selecting radio resources to be allocated to the uplink response signal, on the basis of the notified first specification information and the notified second specification information.

2. The radio resource selecting method according to claim 1, wherein
    the second specification information is information for further specifying radio resources from the radio resources specified by the first specification information.

3. The radio resource selecting method according to claim 1, wherein
    the first specification information is information for specifying absolute identification information of radio resources to be allocated to the uplink response signal, from the plurality of radio resources; and
    the second specification information is information for specifying relative identification information for further specifying radio resources from the radio resources specified by the first specification information.

4. The radio resource selecting method according to claim 1, wherein
    the second specification information is information for further adjusting the radio resources specified by the first specification information.

5. The radio resource selecting method according to claim 1, wherein
    the first specification information is notified by an RRC message; and
    the second specification information is notified by a PDCCH.

6. The radio resource selecting method according to claim 5, wherein
    the second specification information is notified by a command used in transmission power control in the PDCCH.

7. The radio resource selecting method according to claim 1, wherein
    the downlink signal is persistently allocated.

8. A radio base station configured to select a radio resource to be allocated to an uplink response signal indicating a reception state of a downlink signal, from a plurality of radio resources defined successively on a radio resource space formed with the frequency axis and the code axis, the radio base station comprising:
    a first specification information generator unit configured to generate first specification information for specifying, from the plurality of radio resources, radio resources to be allocated to the uplink response signal;
    a first specification information notifying unit configured to notify the generated first specification information;
    a second specification information generator unit configured to generate second specification information for specifying, from the plurality of radio resources, radio resources to be allocated to the uplink response signal; and
    a second specification information notifying unit configured to notify the generated second specification information,
    wherein a mobile station, which has received the notified first specification information and the notified second specification information, selects radio resources to be allocated to the uplink response signal, on the basis of the notified first specification information and the notified second specification information.

9. The radio base station according to claim 8, wherein
    the second specification information generator unit is configured to generate, as the second specification information, information for further specifying radio resources from the radio resources specified by the first specification information.

10. The radio base station according to claim 8, wherein
    the first specification information generator unit is configured to generate, as the first specification information, information for specifying absolute identification information of radio resources to be allocated to the uplink response signal, from the plurality of radio resources; and
    the second specification information generator unit is configured to generate, as the second specification information, information for specifying relative identification information for further specifying radio resources from the radio resources specified by the first specification information.

11. The radio base station according to claim 8, wherein
    the second specification information generator unit is configured to generate, as the second specification information, information for further adjusting the radio resources specified by the first specification information.

12. The radio base station according to claim 8, wherein
    the first specification information notifying unit is configured to notify the first specification information by an RRC message; and
    the second specification information notifying unit is configured to notify the second specification information by a PDCCH.

13. The radio base station according to claim 12, wherein the second specification information notifying unit is configured to notify the second specification information by a command used in transmission power control in the PDCCH.

14. The radio base station according to claim 8, wherein the downlink signal is persistently allocated.

15. A mobile station used in a mobile communication system in which a radio resource to be allocated to an uplink response signal indicating a reception state of a downlink signal is selected from a plurality of radio resources defined successively on a radio resource space formed with the frequency axis and the code axis, the mobile station comprising:
a first specification information receiver unit configured to receive, from a radio base station, first specification information for specifying radio resources to be allocated to the uplink response signal;
a second specification information receiver unit configured to receive, from the radio base station, second specification information for specifying radio resources to be allocated to the uplink response signal; and
a radio resource selector unit configured to select radio resources to be allocated to the uplink response signal, on the basis of the first specification information received by the first specification information receiver unit and the second specification information received by the second specification information receiver unit.

16. The mobile station according to claim 15, wherein the second specification information receiver unit is configured to receive, as the second specification information, information for further specifying radio resources from the radio resources specified by the first specification information.

17. The mobile station according to claim 15, wherein the first specification information receiver unit is configured to receive, as the first specification information, information for specifying absolute identification information of radio resources to be allocated to the uplink response signal, from the plurality of radio resources; and
the second specification information receiver unit is configured to receive, as the second specification information, information for specifying relative identification information for further specifying radio resources from the radio resources specified by the first specification information.

18. The mobile station according to claim 15, wherein the second specification information receiver unit is configured to receive, as the second specification information, information for further adjusting the radio resources specified by the first specification information.

19. The mobile station according to claim 15, wherein the first specification information receiver unit is configured to receive the first specification information by an RRC message; and
the second specification information receiver unit is configured to receive the second specification information by a PDCCH.

20. The mobile station according to claim 19, wherein the second specification information receiver unit is configured to receive the second specification information by a command used in transmission power control in the PDCCH.

21. The mobile station according to claim 15, wherein the downlink signal is persistently allocated.

* * * * *